(12) United States Patent
Granado et al.

(10) Patent No.: US 9,032,804 B2
(45) Date of Patent: May 19, 2015

(54) LARGE-AREA EXTENSIBLE PRESSURE SENSOR FOR TEXTILES SURFACES

(71) Applicant: SENSING TEX, S.L., Barcelona (ES)

(72) Inventors: Miguel Ridao Granado, Barcelona (ES); Luis Miguel Gomez Anta, Barcelona (ES)

(73) Assignee: SENSING TEX, S.L., Barcelona (ES)

( * ) Notice: Subject to any disclaimer, the term of this patent is extended or adjusted under 35 U.S.C. 154(b) by 162 days.

(21) Appl. No.: 13/934,301

(22) Filed: Jul. 3, 2013

(65) Prior Publication Data

US 2014/0007704 A1    Jan. 9, 2014

(51) Int. Cl.
*G01L 9/06* (2006.01)
*G01L 1/18* (2006.01)
*G01L 9/00* (2006.01)
*G01L 1/20* (2006.01)

(52) U.S. Cl.
CPC ... *G01L 1/18* (2013.01); *G01L 9/06* (2013.01); *G01L 9/0052* (2013.01); *G01L 1/20* (2013.01)

(58) Field of Classification Search
CPC ..... H01L 23/293; H01L 27/016; H01L 28/10; H01L 28/20; H01L 28/40; H01L 29/0669; H01L 29/66; H01L 29/66007; H01L 29/7787; H01L 29/78603; H01L 29/7869; H01L 29/78696; H01L 29/812; H01L 29/861

USPC .................................................... 73/700–756
See application file for complete search history.

(56) References Cited

U.S. PATENT DOCUMENTS

| | | | | |
|---|---|---|---|---|
| 5,695,859 | A * | 12/1997 | Burgess | 428/209 |
| 7,311,009 | B2 * | 12/2007 | Kotovsky | 73/777 |
| 2009/0303400 | A1 * | 12/2009 | Hou et al. | 349/12 |
| 2010/0288635 | A1 * | 11/2010 | Komiya et al. | 204/406 |
| 2012/0055257 | A1 * | 3/2012 | Shaw-Klein | 73/780 |
| 2012/0312102 | A1 * | 12/2012 | Alvarez et al. | 73/862.041 |
| 2013/0140649 | A1 * | 6/2013 | Rogers et al. | 257/414 |

* cited by examiner

*Primary Examiner* — Andre Allen
(74) *Attorney, Agent, or Firm* — Sturm & Fix LLP

(57) ABSTRACT

The invention relates to a large-area extensible pressure sensor for textile surfaces, of the type comprising a support on which a conductive ink is printed which can transmit a printed electrical signal by any known printing technique. More specifically, the pressure sensor is characterized in that said support is flexible, extensible and elastic, and a plurality of main tracks of extensible and elastic conductive ink or paste are printed on said support; on said plurality of main tracks a plurality of piezoresistive paste or ink depositions acting as pressure sensing points are printed, and each of these depositions are linked to a secondary extensible and elastic conductive ink or paste track, which is also printed on said support, resulting in all tracks, primary or secondary, being connected to a control system without crossing each other.

10 Claims, 1 Drawing Sheet

LARGE-AREA EXTENSIBLE PRESSURE SENSOR FOR TEXTILES SURFACES

CROSS REFERENCE TO RELATED APPLICATIONS

This application claims priority of ES Application No. 201231047 filed Jul. 4, 2012, which is incorporated by reference herein in its entirety.

BACKGROUND OF THE INVENTION

Field of the Invention

The purpose of the patent application herein is to register a large-area extensible pressure sensor for textile surfaces, where the large area shall be understood to be any surface with an area larger than 1 mm$^2$. Notably, due to the mechanical properties of all materials and textile supports, due to the use of conductive inks and extensible piezoresistives and deposition systems thereof, the pressure sensor object of this invention comprises a number of mechanical properties such as flexibility, including the total folding of the sensor surface, extensibility and elasticity. This pressure sensor maintains its functionality even in states of flexibility and extensibility, the pressure sensor being capable of recovering its shape due to the elastic properties of the support once the external deformation received is finalised.

More specifically, this large-area pressure sensor has a plurality of tracks in conductive ink or paste on which a plurality of detection points in piezoresistive ink or paste are printed, such that these detection points quantify the pressure or normal force applied to them and transmit it through the aforementioned tracks to a control system. Thus, the control system can transmit the pressure detected to graphical representation means, which are able to perform a visual representation of the pressures produced along the surface of this pressure sensor, this graphical representation being called a pressure map.

SUMMARY OF THE INVENTION

Currently, pressure sensors on textile supports are known, composed of a base fabric layer which is integrated into a conductive layer, which is usually composed of threads, plastic sheets or other conductive materials that are applied such as pastes or inks, but in no case are they extensible. Additionally, for the correct operation of these conductive materials, they must be covered by an encapsulating layer with insulating properties, which in turn this encapsulating layer is covered with a overlying fabric layer.

On one hand, notably nowadays, conductive inks are known that are obtained by dispersing conductive particles in polymer resin with conductive properties. Additionally, this configuration provides the ink with a paste-like texture, i.e. serving as a pseudoplastic fluid, in order be printed by any known printing method.

On the other hand, piezoresistive materials composed of variable resistance materials having been subjected to external pressure are also known, although the applicant is not aware of the use of these piezoresistive materials in the form of sensing points, in ink or paste, printed on conductive ink, which forms part of a flexible, elastic and extensible pressure sensor.

Currently, many of these sensors are of the capacitive type, and therefore have capacitive elements for detecting pressure. This type of technical solution has the drawback of consuming a large amount of electricity and has low spatial resolution, i.e. the elements are comparatively larger in size than the resistive type sensors. Due to this configuration many sensors require a signal converter to obtain an electrical measurement that can be processed by a control system.

Thus, pressure sensors are obtained that are unable to indicate the magnitude of pressure received, i.e. they only detect whether or not there is pressure at a point or specific points. Additionally, due to its multilayered configuration these sensors are very thick, inflexible and in no case are they extensible.

Finally, flexible and extensible large-area pressure sensors applied on textiles, which even operate in their states of flexibility and extensibility, are not known by the applicant.

BRIEF DESCRIPTION OF THE INVENTION

The large-area extensible pressure sensor for textile surfaces object of the present registration, solves the abovementioned disadvantages, also providing other additional advantages which will become evident from the description to follow.

This large-area extensible pressure sensor for textile surfaces is of the type comprising a support or substrate on which a conductive ink or paste is printed that can transmit a printed electrical signal by any known printing technique. More specifically, the pressure sensor is characterised in that said support is flexible, extensible and elastic, and a plurality of main tracks of extensible and elastic conductive ink or paste are printed on said support; on said plurality of main tracks a plurality of piezoresistive paste or ink depositions acting as pressure sensing points are printed, and each of these depositions are linked to a secondary extensible and elastic conductive ink or paste track, which is also printed on said support, resulting in all tracks, primary or secondary, being connected to a control system without crossing each other.

The aforementioned piezoresistive ink is capable of modifying its resistance when its surface is subjected to pressure and, thanks to the tracks, primary and secondary, this variation of the resistance of the piezoresistive ink is detected by a control system that analyses the data received, even when the whole pressure sensor is subjected to bending or extension, due to the mechanical characteristics of the substrate and the two inks. More specifically, this is due mainly to the mechanical characteristics of the support and the fact that the conductive ink is formed by a dispersion of conductive particles in intrinsically conductive resin polymers, such that when the tracks print the dispersion of conductive particles is dispensed onto said polymeric material, creating a network of electrical contacts that can transmit electricity, since they have sufficient conductivity to permit the current to flow between the dispersion of conductive particles, even when the material is subjected to extension.

Additionally, because the pressure sensor support is made of a flexible, extensible and elastic, textile type material that can recover its original size and shape without breaking, after being subjected to any external mechanical force that can be carried out by an individual who extends or folds it, and because the tracks, primary or secondary, are made of conductive ink that is also extensible and elastic.

Optionally, each piezoresistive ink deposition can be covered with a conductive ink deposition in the same form as the piezoresistive ink deposition, this being in contact with the secondary track, and this can be conductive ink deposited by any known conventional printing technique.

Usually, printing any of the inks is performed by screen printing or by inkjet, on a textile-type support. Specifically, the tracks made of conductive ink describe extensible forms with alternative inward and outward angles. Additionally, the aforementioned conductive ink comprises particles of graphene fibres dispersed on a conductive polymer and the piezoresistive ink comprises a dispersion of conductive or graphite materials on a polymeric matrix with a circular or polygonal configuration. Thanks to this configuration of the tracks, greater extensibility thereof is achieved than when using printed tracks in a straight line configuration, for a support or substrate with identical characteristics.

Of note, advantageously all inks or pastes required to achieve a pressure sensor on said support or substrate are integrated into a single print process, which generates a very easy and quick manufacturing process of the pressure sensor, usually using the technique known as "roll to roll" used in the production of electronic devices on flexible media in which the manufacturing process usually involves several treatments or impressions made on-line on the same support.

Additionally, in order to obtain a pressure map, the primary and secondary tracks of the pressure sensor are connected to said control system. This control system sends an electrical signal through the primary tracks to the piezoresistive ink depositions, wherein these allow the electric current to pass through gradually and in direct proportion to the pressure each element of the sensor pressure receives externally. Notably, the return of the electrical signal is performed individually by the secondary tracks when the piezoresistive ink depositions allows this. Thus, the control system compares the sensor input and output voltage, i.e. the voltage injected by the control system to the pressure sensor with the voltage received from the pressure sensor.

Thanks to the mechanical properties of the substrate and the inks, and the print configurations of these inks, the pressure sensor can withstand extensions of up to 20% without the aforementioned pressure map being affected. This is because, all or part of the surface of the pressure sensor can be extended up to 20%, without the value of the resistance of the conductive ink tracks being modified substantially, when compared to its value prior to said extension. This variation in resistance of the conductive ink tracks is negligible when compared to the usual resistance of the piezoresistive ink depositions that are along the whole circuit of said tracks. Thus, although the piezoresistive ink enables maximum power transmission, i.e. in its low resistance state, this resistance is of an order of magnitude higher than the resistance of the conductive ink track, even when the pressure sensor is at its maximum state of extension. Therefore, for an extension of up to 20% of its surface, the pressure sensor can receive and transmit electrical signals to the control system, without compared electrical values being affected.

Another advantage of using this conductive ink in this pressure sensor, is that the polymeric material forming said ink can protect the conductive fibres dispersed in this from the environmental effects such as moisture, preventing encapsulation of conductive ink tracks.

Thus, due to the type of substrate and the types of inks used and the arrangement of these on the substrate, a flexible, extensible and elastic pressure sensor is obtained that can be adapted to any type of surface, enabling the pressure that is applied to these surfaces to be detected.

To complete the description given below, and in order to help to better understand its characteristics, attached to the descriptive memory herein are a set of drawings the figures of which, in an illustrative and not-limitative manner, represent the most significant details of the invention.

DETAILED DESCRIPTION OF THE INVENTION

In view of the commented figures and according to the adopted numbering, a preferred although non-limiting embodiment of the invention can be observed therein, which consists of a large-area extensible pressure sensor for textile surfaces, hereinafter referred to as (1), and typically carried out by processes known as "roll to roll" of the processes used to create electronic devices in various reliable, flexible substrates such as textiles.

Figure 1:
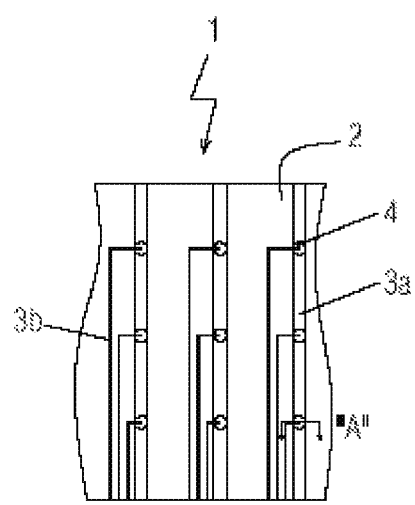
FIG. 1.—Schematic view showing the configuration of a sensor according to the preferred embodiment of the invention herein, and FIG. 2.—Exploded, schematic view of detail "A" indicated in FIG. 1.

In a preferred embodiment of the invention, as can be seen in FIG. 1, this sensor (1) is composed of a fabric-type flexible, extensible and elastic substrate (2) on which printed conductive inks or pastes in the form of primary tracks (3a) rest, such that on said tracks (3a) a plurality of pressure sensing points (4) circular in shape and made of piezoresistive ink or paste are printed, on which both secondary tracks (3b) made in conductive ink or paste are partially printed, avoiding direct contact between the aforementioned tracks (3a, 3b). All these prints are performed by screen printing during the "roll to roll" process following this explanatory order. Notably, this fabric (2) may have any desired shape and dimension and the number of pressure sensing points (4), and the location of these, varies depending on the sensitivity to be provided to the sensor pressure (1), or the specific requirements of the application thereof.

Figure 2:
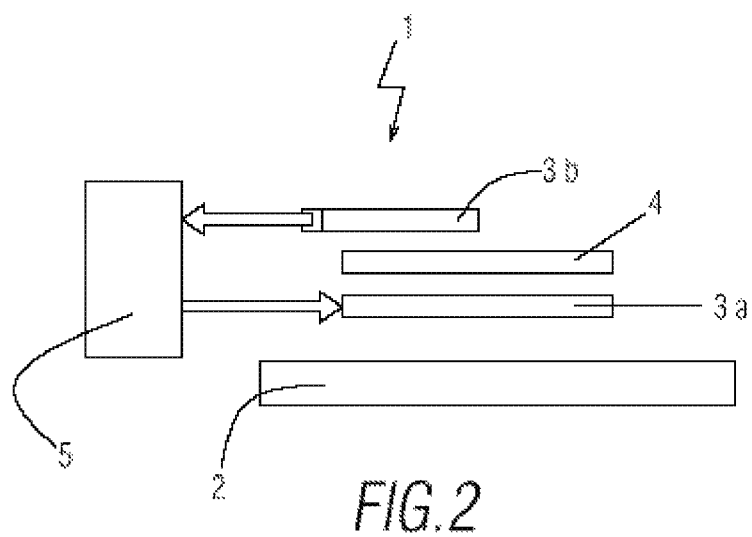

More specifically, the configuration of the pressure sensor (1) is reflected in detail "A" of FIG. 1 which is shown more clearly in FIG. 2, where the arrangement of the main tracks (3a) can be seen, which is composed of a dispersion of conductive material such as graphene fibres or similar, in a polyphenol-type polymer resin or a similar. This pressure detection point (4) is on this main track (3a), which is composed of a dispersion of conductive or graphite materials or similar, on a polymeric matrix of elastic deformable material such as silicone. Finally, on this pressure sensor (4), there is a secondary track (3b), also composed of a dispersion of graphene fibre-type conductive material or similar in a polyphenol-type polymeric resin. Additionally, all tracks (3a, 3b) are connected by wiring to a control system (5) such that said control system (5) transmits an electrical signal in the form of a voltage to each main track (3a). Thus, when any pressure sensor (4) is deformed, this will transmit an electricity amount in the form of voltage to the secondary track (3b) based on the external pressure received, and in turn, this secondary track (3b) will return it to the control system (5) which will perform the calculations according to an algorithm incorporated therein to know the amount of external pressure received by each pressure point (4) and make a pressure map from the external pressures received on the fabric (2). Typically, the control system (5) comprises a central processing unit with a microprocessor data storage system and at least one means of graphical representation of the results processed by the microprocessor.

In an alternative embodiment, not shown, the main and secondary tracks are printed in a zigzag or shape.

In another alternative embodiment, not shown, the primary or secondary tracks are printed in a zigzag or similar shape.

In another alternative embodiment, not shown, a hospital bed is covered with a pressure sensor in the form of sheet, and a patient with mobility problems rests on this hospital bed. Thus, the pressure sensor, thanks to it novel configuration and its control system, detects the areas of the body where the patient may be experiencing some problems as a result of staying in the same position for a long time, such as bedsores, and staff are notified, by any method used in hospitals, of the need to change the patient's position.

The details, shapes and dimensions and other accessory elements as well as the materials used in the manufacture of the deformable, elastic and flexible pressure sensor of the invention may be conveniently replaced by others which are technically equivalent and do not depart from the essential nature of the invention or from the scope defined by the claims provided hereinafter.

The invention claimed is:

1. A large-area extensible pressure sensor for textiles surfaces, of the type comprising a support or substrate on which a conductive paste or ink is printed which can transmit a printed electrical signal printed by any known printing technique, wherein said support is flexible, extensible and elastic, and a plurality of main tracks of extensible and elastic conductive ink or paste are printed on said support; on said plurality of main tracks a plurality of piezoresistive paste or ink depositions acting as pressure sensing points are printed, and each of these depositions are linked to a secondary extensible and elastic conductive ink or paste track, which is also printed on said support, resulting in all tracks, primary or secondary, being connected to a control system without crossing each other.

2. The pressure sensor according to claim 1, wherein each piezoresistive ink deposition is covered with a conductive ink deposition in the same form as the piezoresistive ink deposition and is in contact with the secondary track, and wherein this can be conductive ink deposited by any known conventional printing technique.

3. The pressure sensor according to claim 1, wherein said plurality of piezoresistive ink depositions have a polygonal configuration.

4. The pressure sensor according to claim 1, wherein said plurality of piezoresistive ink depositions have a circular configuration.

5. The pressure sensor according to claim 1, wherein printing any of the inks is performed by screen printing.

6. The pressure sensor according to claim 1, wherein printing any of the inks is performed by inkjet.

7. The pressure sensor according to claim 1, wherein the support is of the textile type.

8. The pressure sensor according to claim 1, wherein the conductive ink pastes describe extensible forms with alternative inward and outward angles.

9. The pressure sensor according to claim 1, wherein said conductive ink or paste comprises particles of graphene fibres dispersed on a conductive polymer.

10. The pressure sensor according to claim 1, wherein said piezoresistive ink or paste comprises a dispersion of conductive or graphite materials on a polymeric matrix.

* * * * *